United States Patent
Matsuki et al.

(10) Patent No.: US 11,850,827 B2
(45) Date of Patent: Dec. 26, 2023

(54) INTERLAYER FILM FOR LAMINATED GLASS AND LAMINATED GLASS

(71) Applicant: SEKISUI CHEMICAL CO., LTD., Osaka (JP)

(72) Inventors: Nobuo Matsuki, Settsu (JP); Shinji Kawada, Takatsuki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 173 days.

(21) Appl. No.: 17/414,163

(22) PCT Filed: Dec. 20, 2019

(86) PCT No.: PCT/JP2019/049990
§ 371 (c)(1),
(2) Date: Jun. 15, 2021

(87) PCT Pub. No.: WO2020/130117
PCT Pub. Date: Jun. 25, 2020

(65) Prior Publication Data
US 2022/0063248 A1    Mar. 3, 2022

(30) Foreign Application Priority Data

Dec. 21, 2018  (JP) ................ 2018-240380

(51) Int. Cl.
*B32B 17/10* (2006.01)

(52) U.S. Cl.
CPC ........ *B32B 17/10761* (2013.01); *B32B 17/10* (2013.01); *B32B 17/10036* (2013.01); *B32B 2307/542* (2013.01)

(58) Field of Classification Search
None
See application file for complete search history.

(56) References Cited

U.S. PATENT DOCUMENTS

2016/0214355 A1 * 7/2016 Mikayama ........ B32B 17/10018

FOREIGN PATENT DOCUMENTS

| | | |
|---|---|---|
| CN | 105324345 | 2/2016 |
| CN | 106795049 | 5/2017 |
| CN | 107074649 | 8/2017 |
| CN | 107108348 | 8/2017 |
| CN | 107710035 | 2/2018 |
| JP | 2002-348150 | 12/2002 |
| JP | 2012-31059 | 2/2012 |
| JP | 2012-35633 | 2/2012 |
| JP | 2016-216592 | 12/2016 |
| JP | 2017-114028 | 6/2017 |
| JP | 2017-178692 | 10/2017 |
| TW | 201841859 | 12/2018 |
| WO | 2016/158694 | 10/2016 |
| WO | 2018/159520 | 9/2018 |
| WO | 2018/181748 | 10/2018 |

OTHER PUBLICATIONS

International Search Report dated Mar. 17, 2020 in International (PCT) Application No. PCT/JP2019/049990.
Extended European Search Report dated Aug. 2, 2022 in European Patent Application No. 19899063.2.

* cited by examiner

*Primary Examiner* — Ramsey Zacharia
(74) *Attorney, Agent, or Firm* — Wenderoth, Lind & Ponack, L.L.P.

(57) ABSTRACT

An interlayer film for laminated glass of the present invention has an average storage modulus (G') at 110 to 150° C. measured at a frequency of 1 Hz in a shear mode of 15000 Pa or less, and has an adhesive strength of 0.3 N/mm² or more as measured in a cross peeling test performed under the following conditions on a cross peeling test sample produced by a predetermined method. Cross peeling test: A maximum load (N) when the polycarbonate plate glass is peeled from the clear float plate glass in a direction perpendicular to an adhesive surface at a rate of 10 mm/min at 23° C. is measured, and that measured maximum load (N) is taken as the adhesive strength.

7 Claims, 1 Drawing Sheet

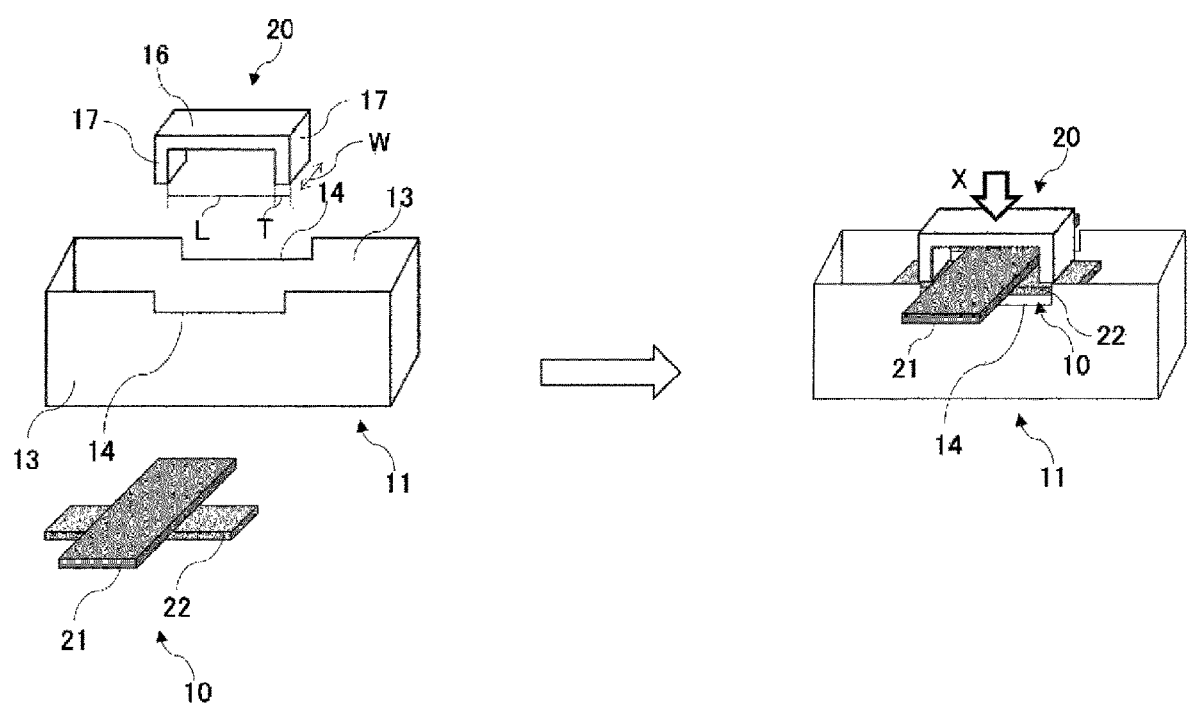

INTERLAYER FILM FOR LAMINATED GLASS AND LAMINATED GLASS

TECHNICAL FIELD

The present invention relates to an interlayer film for laminated glass and to a laminated glass comprising the interlayer film for laminated glass.

BACKGROUND ART

Conventionally, an integrated laminated glass in which an interlayer film for laminated glass is interposed between two glass plates is widely known. The interlayer film for laminated glass is often formed from a plasticized polyvinyl acetal in which a plasticizer is mixed with a polyvinyl acetal resin. Laminated glass is safe because glass fragments are less likely to scatter even when the laminated glass is damaged by an external impact, and is thus widely used as window glass of vehicles such as automobiles, aircraft, and buildings.

As the glass plates in a laminated glass, generally an inorganic glass is widely used. However, inorganic glass suffers from problems such as a heavy weight and cracking when subjected to an impact. Therefore, an organic glass such as a polycarbonate plate or a polymethyl methacrylate plate may be used for one of the laminated glass plates.

Laminated glass is generally produced by disposing an interlayer film for laminated glass between two glass plates and subjecting the laminated glass to thermocompression bonding under high temperature and high pressure in an autoclave or the like. However, when one of the two glass plates in the laminated glass is an organic glass, the laminated glass may warp, crack, delaminate, and the like when the temperature is returned to room temperature after thermocompression bonding, due to a difference in linear expansion coefficients or the like between the inorganic glass and the organic glass.

Conventionally, to prevent warpage, cracking, and the like from occurring due to a difference in linear expansion coefficients, for example, Patent Literature 1 discloses a method for obtaining a laminated glass by using an adhesive sheet having a UV-curable pressure-sensitive adhesive layer as an interlayer film for laminated glass, and the pressure-sensitive adhesive layer is cured with UV-rays in a state in which the adhesive sheet is disposed between two glass plates. According to this method, since thermocompression bonding in an autoclave or the like is not required for bonding the two glass plates, the occurrence of warpage, cracking, and the like is prevented.

Further, for example, Patent Literature 2 discloses that the warpage that occurs during cooling is suppressed by subjecting an organic glass plate and an inorganic glass plate to thermocompression bonding via a interlayer film for laminated glass at a temperature of more than 80° C. and less than 150° C., and then cooling the laminated glass to 60° C. at an average cooling rate of 30° C./min or more and 500° C./min or less.

CITATION LIST

Patent Literature

PTL1: JP 2002-348150 A
PTL2: JP 2012-35633 A

SUMMARY OF INVENTION

Technical Problem

However, when two glass plates are adhered by UV curing as in Patent Literature 1, there are many restrictions on the production process, and mass production may not be possible. On the other hand, when an inorganic glass and an organic glass are adhered by thermocompression boding in an autoclave or the like, although a certain amount of warpage can be suppressed by adjusting the production conditions as in Patent Literature 2, for a laminated glass in which warpage tends to occur because for the glass area is large for example, warpage, cracking, and delamination cannot be sufficiently suppressed, and hence there is room for improvement.

Therefore, an object of the present invention is to provide a interlayer film for laminated glass capable of sufficiently suppressing warpage, cracking, and delamination even when a laminated glass is obtained by adhering an inorganic glass and an organic glass by pressure-boding in an autoclave or the like.

Solution to Problem

As a result of diligent studies, the present inventors found that the above-described problem could be solved by adjusting an average storage modulus (G') at 110 to 150° C. and an adhesive strength as measured in a cross peeling test performed under predetermined conditions, to complete the following invention.

That is, the present invention provides the following [1] to [8].

[1] An interlayer film for laminated glass having an average storage modulus $(G')_a t$ 110 to 150° C. measured at a frequency of 1 Hz in a shear mode of 15000 Pa or less, and having an adhesive strength of 0.3 N/mm$^2$ or more as measured in a cross peeling test performed under the following conditions on a cross peeling test sample obtained by carrying out, in order, the following first, second, and third processes:

First process: a interlayer film for laminated glass having a length of 15 mm and a width of 15 mm, a clear float plate glass having a thickness of 1.8 mm, a length of 25 mm, and a width of 100 mm in accordance with JIS 3202, and a polycarbonate plate glass having a thickness of 2 mm, a length of 25 mm and a width of 100 mm in accordance with JIS K6735 are provided, and the clear float plate glass and the polycarbonate plate glass were laminated in a cross shape via the interlayer film for laminated glass;

Second process: using a spacer having the same thickness as the interlayer film for laminated glass so that the thickness of the interlayer film for laminated glass is constant, the clear float plate glass and the polycarbonate plate glass laminated via the interlayer film for laminated glass are temporarily bonded for 3 minutes under conditions of 60° C. and 0.1 MPa in a vacuum laminator;

Third process: the temporarily bonded clear float plate glass and polycarbonate plate glass are then subjected to main pressure-bonding for 1 hour under conditions of 80° C. and 0.5 MPa; and Cross peeling test: a maximum load (N) when the polycarbonate plate glass is peeled from the clear float plate glass in a direction perpendicular to an adhesive surface at a rate of 10 mm/min at 23° C. is measured, and that measured maximum load (N) is taken as the adhesive strength.

[2] The interlayer film for laminated glass according to [1], wherein the interlayer film for laminated glass has a first glass transition temperature (Tg1) counted from the low temperature side in a temperature range of −50 to 150° C. of −5° C. or less.

[3] The interlayer film for laminated glass according to [1] or [2], which comprises an acrylic resin.

[4] The interlayer film for laminated glass according to [3], which further comprises a polyvinyl acetal resin.

[5] The interlayer film for laminated glass according to any one of [1] to [4], which comprises a resin cured by active energy rays.

[6] The interlayer film for laminated glass according to any one of [1] to [5], wherein a content of a plasticizer is 0 parts by mass or more and less than 10 parts by mass per 100 parts by mass of the resin included in the interlayer film for laminated glass.

[7] A laminated glass comprising:
the interlayer film for laminated glass according to any one of [1] to [6]; and
a first glass and a second glass that are laminated via the interlayer film for laminated glass,
wherein the first glass is an organic glass and the second glass is any one of an organic glass and an inorganic glass.

[8] The laminated glass according to [7], wherein the second glass is an inorganic glass.

Advantageous Effects of Invention

According to the interlayer film for laminated glass of the present invention, the occurrence of warpage, cracking, and delamination can be sufficiently suppressed even when a laminated glass is obtained by adhering an inorganic glass and an organic glass by pressure-bonding in an autoclave or the like.

BRIEF DESCRIPTION OF DRAWINGS

FIG. 1 is a perspective diagram illustrating a cross peeling test.

DESCRIPTION OF EMBODIMENTS

The interlayer film for laminated glass of the present invention will now be described in detail.
[Interlayer Film for Laminated Glass]
The interlayer film for laminated glass of the present invention (hereinafter, sometimes simply referred to as "interlayer film") satisfies the following requirements (I) and (II).

(I) The average storage modulus (G') of the interlayer film at 110 to 150° C. measured at a frequency of 1 Hz in a shear mode is 15000 Pa or less.

(II) The adhesive strength in a cross peeling test of a laminated glass obtained by subjecting a predetermined clear float plate glass and a polycarbonate plate glass to thermocompression bonding in an autoclave via an interlayer film under predetermined conditions is 0.3 N/mm$^2$ or more.

The interlayer film of the present invention can, by satisfying the requirements (I) and (II), provide an interlayer film capable of sufficiently suppressing warpage, cracking, and delamination even for a laminated glass obtained by adhering an inorganic glass and an organic glass via an interlayer film by pressure-adhering in an autoclave or the like. In particular, as shown in the requirement (II), cracking and warpage tend to occur when the adhesive strength is increased, but in the present invention, the occurrence of cracking and warpage can be effectively suppressed even when the adhesive strength is high by, as in the requirement (I), reducing the average storage modulus (G') to 15000 Pa or less.

On the other hand, when the average storage modulus (G') of the interlayer film at 110 to 150° C. is larger than 15000 Pa, warpage and cracking may occur during cooling when pressure adhesion is performed in an autoclave or the like and the organic glass and the inorganic glass are adhered via the interlayer film. In order to further suppress the occurrence of cracking and warpage, the average storage modulus (G') is preferably 13000 Pa or less, and more preferably 10000 Pa or less.

Further, the average storage modulus (G') of the interlayer film at 110 to 150° C. is, in order to facilitate an increase in the adhesive strength shown in the requirement (II), preferably 1000 Pa or more, and more preferably 2500 Pa or more.

It is noted that in the present invention, the average storage modulus (G') is determined by measuring the viscoelasticity at a rate of increase in temperature of 5° C./min at a frequency of 1 Hz in a shear mode at −50 to 200° C., detecting the storage modulus every 1° C., and calculating the arithmetic mean value at 110 to 150° C. of the detected storage modulus.

Further, when the adhesive strength in the cross peeling test is less than 0.3 N/mm$^2$, sufficient adhesive strength is not obtained when the organic glass and the inorganic glass are adhered via the interlayer film by pressure-adhering in an autoclave or the like, and as a result peeling occurs between the organic glass and the inorganic glass. From the viewpoint of sufficiently suppressing peeling, the adhesive strength in the cross peeling test is preferably 0.35 N/mm$^2$ or more, more preferably 0.5 N/mm$^2$ or more, and further preferably 0.7 N/mm$^2$ or more.

Further, from the viewpoint of suppressing peeling, the upper limit of the adhesive strength in the cross peeling test is not limited and may be as high as possible, but is practically, for example, 10 N/mm$^2$ or less. Further, from the viewpoint of making it more difficult for warpage to occur during cooling after thermocompression bonding, the adhesive strength in the cross peeling test is preferably 5 N/mm$^2$ or less, and more preferably 1.2 N/mm$^2$ or less.

The method for measuring the adhesive strength in the cross peeling test is carried out on a cross peeling test sample obtained by carrying out, in order, the following first, second, and third processes.

First process: An interlayer film having a length of 15 mm and a width of 15 mm, a clear float plate glass having a thickness of 1.8 mm, a length of 25 mm, and a width of 100 mm in accordance with JIS 3202, and a polycarbonate plate glass having a thickness of 2 mm, a length of 25 mm and a width of 100 mm in accordance with JIS K6735 are provided, and the clear float plate glass and the polycarbonate plate glass are laminated in a cross shape via the interlayer film.

Second process: Using a spacer having the same thickness as the interlayer film so that the thickness of the interlayer film is constant, the clear float plate glass and the polycarbonate plate glass laminated via the interlayer film are temporarily bonded for 3 minutes under conditions of 60° C. and 0.1 MPa in a vacuum laminator.

Third process: The temporarily bonded clear float plate glass and polycarbonate plate glass are then subjected to main pressure-bonding for 1 hour under conditions of 80° C. and 0.5 MPa.

In the cross peeling test, a maximum load (N) when the polycarbonate plate glass is peeled from the clear float plate glass in a direction perpendicular to an adhesive surface at a rate of 10 mm/min at 23° C. is measured, and that measured maximum load (N) is taken as the adhesive strength.

More specifically, the adhesive strength may be measured by setting the sample in the jig illustrated in FIG. 1. The jig includes a box body 11 and a pressing member 20. The box body 11 and the pressing member 20 are made of SUS. The box body 11 has a cuboid shape with an open upper face, and rectangular notches 14 and 14 are provided on the upper edge faces of side surfaces 13 and 13 facing each other. The pressing member 20 is a U-shaped member provided with a rectangular base portion 16 and pressing pieces 17 and 17 connected at right angles to both edges of the base 16 in the longitudinal direction. Each pressing piece 17 has a width W of 20 mm and a thickness T of 5 mm, and a distance L between the pressing pieces 17 and 17 is 35 mm.

A cross peeling test sample 10 was disposed so that a polycarbonate plate 22 is disposed on the lower side and a clear float plate glass 21 is placed across the notches 14 and 14. The maximum load (N) when a polycarbonate plate glass 31 is peeled off by applying a load in a vertically downward direction X, which is the direction perpendicular to the adhesive surface, at a rate of 10 mm/min was measured, and the adhesive strength (N/mm$^2$) was calculated from the maximum load (N).

The interlayer film of the present invention preferably has a first glass transition temperature (Tg1) counted from the low temperature side in a temperature range of −50 to 150° C. of −5° C. or less. By setting the glass transition temperature (Tg1) to −5° C. or less, it is easier to increase the adhesive strength shown in the above requirement (II) while reducing the average storage modulus (G') at 110 to 150° C. From these viewpoints, the glass transition temperature (Tg1) is more preferably −10° C. or less, further preferably −15° C. or less, and still further preferably −22° C. or less. The lower limit of the glass transition temperature (Tg1) is not limited as long as it is −50° C. or more, but it may be −40° C. or more.

The glass transition temperature (Tg1) is not particularly limited, and can be, as described later, easily adjusted to within the above range by appropriately adjusting the type of resin contained in the interlayer film, the amount of each resin, and the like.

It is noted that the glass transition temperature (Tg1) is the peak temperature of a loss tangent tan δ obtained from the result of the above viscoelasticity measurement, and is the first peak temperature counted from the low temperature side in the temperature range of −50 to 150° C.

The interlayer film of the present invention includes a resin. The resin used for the interlayer film of the present invention is preferably a thermoplastic resin. By using a thermoplastic resin for the resin, a pair of glass plates can be easily bonded via the interlayer film by thermocompression bonding in an autoclave or the like.

Examples of the resin used for the interlayer film include an acrylic resin, a polyvinyl acetal resin, a polyvinyl alcohol resin (PVA), a polyurethane resin (PU), an ethylene-vinyl acetate copolymer resin (EVA), an ionomer resin, a polyamide resin (PA), and an isobutylene resin. These resins are preferably thermoplastic resins.

The resin used for the interlayer film may be used alone or in combination of two or more thereof, but from the viewpoint of reducing the average storage modulus (G') at 110 to 150° C. while increasing the above-described adhesive strength, it is preferable to use two or more types in combination. Further, it is preferable that the interlayer film have a phase-separated structure, such as a sea-island structure, by using two or more types in combination. When having a phase-separated structure, it is preferable to use a hard resin for the sea portion to improve adhesive strength and handleability, and to use a soft resin for the island portion. With such a structure, the average storage modulus (G') can be lowered. However, a soft resin may be used for the sea portion and a hard resin used for the island portion. As the hard resin, a polyvinyl acetal is preferable, and as the soft resin, an acrylic resin is preferable.

In the interlayer film of the present invention, the resin constitutes a main component, and the content of the resin in the interlayer film is, based on the total amount in the interlayer film, usually 75% by mass or more, preferably 85% by mass or more, and more preferably 95% by mass or more. Further, the upper limit of the resin content is not particularly limited, and is 100% by mass.

The interlayer film preferably includes an acrylic resin as the resin. By including an acrylic resin, the glass transition temperature (Tg1) can be adjusted to a low value, and the above-described average storage modulus (G') and adhesive strength can be easily adjusted to within the desired range. The content of the acrylic resin is, based on the total amount of resin included in the interlayer film, for example, 50% by mass or more, preferably 65% by mass or more, more preferably 72% by mass or more, and further preferably 82% by mass or more.

In addition, in the interlayer film, an acrylic resin may be used alone as a resin component, and the content of the acrylic resin may be 100% by mass or less based on the total amount of resin included in the interlayer film. However, from the viewpoint of making it easier to adjust the above-described average storage modulus (G') and adhesive strength to within the desired range and further suppressing warpage, cracking, and peeling, it is preferable to contain a component other than an acrylic resin. From such a viewpoint, the content of the acrylic resin is preferably 95% by mass or less, and more preferably 90% by mass or less.

Further, as described above, in addition to an acrylic resin, the interlayer film may contain a resin other than an acrylic resin. The resin other than an acrylic resin may be appropriately selected and used from among the above-described resins, but it is preferable to use a polyvinyl acetal resin. As the polyvinyl acetal resin, as described later, it is preferable to use polyvinyl butyral resin (PVB).

In the present invention, by containing a polyvinyl acetal resin, particularly PVB, in the interlayer film in addition to an acrylic resin, it is easier to adjust the above-described average storage modulus (G') and adhesive strength to within the desired range, and easier to suppress warpage, cracking and delamination. From these viewpoints, the content of the polyvinyl acetal resin is, based on the total amount of resin included in the interlayer film, preferably 5% by mass or more, and more preferably 10% by mass or more, and is, for example, 50% by mass or less, preferably 35% by mass or less, more preferably 28% by mass or less, and further preferably 18% by mass or less.

Further, when PVB is also used, the content of PVB in the interlayer film is similar to the content of the above polyvinyl acetal resin, and based on the total amount of resin, is preferably 5% by mass or more, and more preferably 10% by mass or more, and is, for example, 50% by mass or less, preferably 35% by mass or less, more preferably 28% by mass or less, and further preferably 18% by mass or less.

In addition, in the present invention, the resin included in the interlayer film preferably includes a resin (hereinafter, also referred to as "first component") cured by active energy rays. By including a resin cured (e.g., polymerized) by active energy rays in the interlayer film, it is not necessary to heat during the curing of the first component, and therefore performance deterioration due to a thermal history can be prevented. When the interlayer film includes the first component, the resin included in the interlayer film may be the first component alone, but it is preferable to include, in addition to the first component, a resin other than the first component (hereinafter, also referred to as "second component").

Here, the first and second components may be appropriately selected from the resins listed above, but it is preferable that the first component be an acrylic resin, more preferable that the first component be an acrylic resin and the second component be a polyvinyl acetal resin, and further preferable that the first component be an acrylic resin and the second component be PVB.

When the interlayer film contains the first and second components, as described later, it is preferable to cure a precursor of the first component by energy rays in the presence of the second component. As described above, by curing a precursor of the first component by energy rays in the presence of the second component, deterioration of the second component due to heating is prevented. In addition, a sea-island structure having the second component as the sea portion and the first component as the island portion is more easily formed.

The precursor of the first component becomes the first component by irradiating with active energy rays to carry out polymerization. The precursor may be a polymer or an oligomer having a lower degree of polymerization than the first component, but generally a monomer is used.

(Acrylic Resin)

The acrylic resin used in the present invention is an acrylic polymer. The acrylic polymer is a homopolymer of an acrylic monomer having a (meth)acryloyl group in the molecule, or a copolymer containing an acrylic monomer as a monomer unit. The acrylic polymer may be used alone or in combination of two or more thereof.

When the interlayer film of the present invention contains an acrylic resin, the above-described glass transition temperature (Tg1) is preferably expressed due to the acrylic resin. Therefore, the monomer constituting the acrylic polymer may be appropriately selected so that the glass transition temperature of the acrylic resin is within the desired range shown by the glass transition temperature (Tg1) described above.

It is also noted that in this specification, "(meth)acryloyl group" means an acryloyl group or methacryloyl group, "(meth)acrylate" means an acrylate or methacrylate, and other similar terms are also the same.

As the acrylic monomer constituting the acrylic polymer, for example, a monofunctional monomer having one (meth) acryloyloxy group is used. Examples of such an acrylic monomer include an alkyl (meth)acrylate, an alicyclic structure-containing (meth)acrylate, an aromatic ring-containing (meth)acrylate, and the like.

Further, the monofunctional acrylic monomer may be a monomer having a functional group (hereinafter, also referred to as "functional group-containing monomer"), such as a cyclic ether group, a hydroxyl group, a carboxyl group, an amino group, an amide group, a polyoxyethylene group, or an alkoxy group. Specific examples of the functional group-containing monomer include a cyclic ether group-containing (meth)acrylate, a hydroxyl group-containing (meth)acrylate, a carboxyl group-containing acrylic monomer, an amino group-containing acrylic monomer, an amide group-containing acrylic monomer, a polyoxyethylene group-containing acrylic monomer, an alkoxy group-containing acrylic monomer, and the like.

The acrylic monomer may be used alone, but it is preferable to use two or more types in combination. By using two or more types in combination, it is easier to control the average storage modulus (G') and the adhesive strength to within the desired range.

Examples of the alkyl (meth)acrylate include an alkyl (meth)acrylate having an alkyl group having 1 to 18 carbon atoms. Specific examples include methyl (meth)acrylate, ethyl (meth)acrylate, n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, isodecyl (meth)acrylate, lauryl (meth)acrylate, myristyl (meth)acrylate, isomyristyl (meth)acrylate, stearyl (meth)acrylate, isostearyl (meth)acrylate, and the like. Among these, an alkyl (meth)acrylate having an alkyl group having 1 to 8 carbon atoms is preferable, and from the viewpoint of facilitating adjustment of the glass transition temperature (Tg1) to within the desired range, an alkyl acrylate having an alkyl group having 1 to 8 carbon atoms is preferable.

Examples of the alicyclic structure-containing (meth) acrylate include cyclohexyl (meth)acrylate, isobornyl (meth)acrylate, dicyclopentanyl (meth)acrylate, and the like. Examples of the aromatic ring-containing (meth)acrylate include benzyl (meth)acrylate, phenoxyethyl (meth)acrylate, and the like. The alicyclic structure-containing (meth) acrylate and the aromatic ring-containing (meth)acrylate are (meth)acrylates that do not have the functional groups described above.

Examples of the cyclic ether group-containing (meth) acrylate include a (meth)acrylate having an epoxy ring, an oxetane ring, a tetrahydrofuran ring, a dioxolane ring, or a dioxane ring. Among these, from the viewpoint of adhesive strength and the like, a (meth)acrylate containing an epoxy ring or a dioxolane ring is preferable, and a dioxolane ring-containing (meth)acrylate is particularly preferable.

Examples of the epoxy ring-containing (meth)acrylate include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl ether, and 6-hydroxyhexyl (meth)acrylate glycidyl ether.

Examples of the oxetane ring-containing (meth)acrylate include (3-methyloxetane-3-yl)methyl (meth)acrylate, (3-propyloxetane-3-yl)methyl (meth)acrylate, (3-ethyloxetane-3-yl)methyl (meth)acrylate, (3-butyloxetane-3-yl) methyl (meth)acrylate, (3-ethyloxetane-3-yl)ethyl (meth) acrylate, (3-ethyloxetane-3-yl)propyl (meth)acrylate, (3-ethyloxetane-3-yl)butyl (meth)acrylate, (3-ethyloxetane-3-yl)pentyl (meth)acrylate, and (3-ethyloxetane-3-yl)hexyl (meth)acrylate.

Examples of the tetrahydrofuran ring-containing (meth) acrylate include tetrahydrofurfuryl (meth)acrylate, γ-butyrolactone (meth)acrylate, tetrahydrofurfuryl alcohol acrylic acid multimer ester, and the like.

Examples of the dioxolane ring-containing (meth)acrylate include (2-methyl-2-ethyl-1,3-dioxolane-4-yl)methyl (meth)acrylate, (2,2-cyclohexyl-1,3-dioxolane-4-yl)methyl (meth)acrylate, (2,2-dimethyl-1,3-dioxolane-4-yl)methyl (meth)acrylate, (2-methyl-2-isobutyl-1,3-dioxolane-4-yl)methyl (meth)acrylate, and the like.

Examples of the dioxane ring-containing (meth)acrylate include (5-ethyl-1,3-dioxane-5-yl)methyl (meth)acrylate and the like.

Preferable specific examples of the cyclic ether group-containing (meth)acrylate are glycidyl (meth)acrylate and (2-methyl-2-ethyl-1,3-dioxolane-4-yl)methyl (meth)acrylate, but (2-methyl-2-ethyl-1,3-dioxolane-4-yl)methyl (meth)acrylate is more preferable.

Examples of the carboxyl group-containing acrylic monomer include acrylic acid, methacrylic acid, ω-carboxy-polycaprolactone mono(meth)acrylate, and the like. The number of repeating units of polycaprolactone in the ω-carboxy-polycaprolactone mono(meth)acrylate is about 2 to 5, and is preferably 2 to 3. The carboxyl group-containing acrylic monomer is preferably ω-carboxy-polycaprolactone mono(meth)acrylate.

Examples of the hydroxyl group-containing acrylic monomer include 2-hydroxyethyl (meth)acrylate, 3-hydroxypropyl (meth)acrylate, 4-hydroxybutyl (meth)acrylate, 2-acryloyloxyethyl-2-hydroxypropylphthalate, 2-methacryloyloxyethyl-2-hydroxylpropylphthalate, and the like.

Examples of the amino group-containing acrylic monomer include N,N-dimethylaminoethyl (meth)acrylate, N,N-dimethylaminoethyl (meth)methacrylate, N,N-diethylaminoethyl (meth)acrylate, and the like.

Examples of the amide group-containing monomer include N,N-dimethyl (meth)acrylamide, N-isopropyl (meth)acrylamide, N,N-diethyl (meth)acrylamide, N-hydroxyethyl (meth)acrylamide, and the like.

Examples of the polyoxyethylene-containing (meth)acrylate include diethylene glycol monoethyl ether (meth)acrylate.

Examples of the alkoxy-containing monomer include 3-methoxybutyl (meth)acrylate.

As the acrylic monomer constituting the acrylic polymer, a polyfunctional acrylic monomer may be used in addition to the monofunctional acrylic monomer. Examples of the polyfunctional acrylic monomer include a polyfunctional (meth)acrylate.

Examples of the polyfunctional (meth)acrylate include 2,2-bis[4-((meth)acryloxyethoxy)phenyl]propane di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tri(2-(meth)acryloyloxyethyl)phosphate, tetramethylolmethane tri(meth)acrylate, tetramethylolpropane tetra(meth)acrylate, ethylene glycol di(meth)acrylate, diethylene glycol di(meth)acrylate, tetraethylene glycol di(meth)acrylate, 1,6-hexanediol di(meth)acrylate, 1,9-nonanediol di(meth)acrylate, polytetramethylene glycol di(meth)acrylate, neopentyl glycol di(meth)acrylate, 1,3-butylene glycol di(meth)acrylate, and the like.

The acrylic monomer constituting the acrylic polymer preferably contains a functional group-containing monomer, and more preferably contains a cyclic ether group-containing (meth)acrylate as the functional group-containing monomer. In the present invention, using a cyclic ether group-containing (meth)acrylate enables the adhesive strength to be easily improved. Further, as the cyclic ether group-containing (meth)acrylate, it is more preferable to contain a dioxolane ring as described above.

The content of the cyclic ether group-containing (meth)acrylate in the monomers constituting the acrylic polymer is, based on all the monomers constituting the acrylic polymer (hereinafter, simply referred to as "based on all the monomers"), preferably 8% by mass or more and 55% by mass or less, more preferably 12% by mass or more and 45% by mass or less, and further preferably 15% by mass or more and 35% by mass or less.

From the viewpoint of ensuring adhesive strength, the monomers constituting the acrylic polymer may contain, the functional group-containing monomer, another functional group-containing monomer in addition to the cyclic ether group-containing (meth)acrylate. Such a functional group monomer is not particularly limited, but a carboxyl group-containing acrylic monomer is preferable.

It is noted that it is more preferable to use the carboxyl group-containing acrylic monomer when the cyclic ether group-containing (meth)acrylate is an epoxy ring-containing (meth)acrylate. By using the carboxyl group-containing acrylic monomer and the epoxy ring-containing (meth)acrylate in combination, it is easier to improve the adhesive strength and the like.

When a carboxyl group-containing acrylic monomer is used, the content of the carboxyl group-containing acrylic monomer in the monomers constituting the acrylic polymer is, based on all the monomers, preferably 25% by mass or less, more preferably 2% by mass or more and 20% by mass or less, and further preferably 5% by mass or more and 15% by mass or less.

Further, it is preferable that the monomers constituting the acrylic polymer contain, in addition to the above-described functional group-containing monomer, one or more selected from alkyl (meth)acrylate, an alicyclic structure-containing (meth)acrylate, and an aromatic ring-containing (meth)acrylate. The total content of the monomer(s) selected from these is, based on the total amount of the monomers, preferably 45% by mass or more and 92% by mass or less, more preferably 50% by mass or more and 88% by mass or less, and further preferably 55% by mass or more and 85% by mass or less.

Among the above, it is preferable to use an alkyl (meth)acrylate. That is, it is more preferable that the monomers constituting the acrylic polymer contain a cyclic ether group-containing (meth)acrylate and an alkyl (meth)acrylate. By using an alkyl (meth)acrylate, it is easier to adjust the glass transition temperature (Tg1) to within the desired range and to adjust the above-described average storage modulus (G') and adhesive strength to within the predetermined range. The content of the alkyl (meth)acrylate constituting the acrylic polymer is, based on all the monomers, preferably 25% by mass or more and 80% by mass or less, more preferably 30% by mass or more and 70% by mass or less, and further preferably 45% by mass or more and 65% by mass or less.

Further, it is more preferable that the monomer constituting the acrylic polymer contains an aromatic ring-containing (meth)acrylate in addition to the alkyl (meth)acrylate.

The content of the aromatic ring-containing (meth)acrylate is, based on all monomers, preferably 8% by mass or more and 40% by mass or less, more preferably 10% by mass or more and 35% by mass or less, and further preferably 15% by mass or more and 30% by mass or less.

The monomer constituting the acrylic polymer may be used in combination with a vinyl monomer other than an acrylic monomer in addition to the acrylic monomer having a (meth)acryloyl group in the molecule. The acrylic polymer may be polymerized by a solution polymerization method, a suspension polymerization method, or the like, but as described later, it is preferable to polymerize the acrylic polymer by irradiating it with active energy rays.

(Polyvinyl Acetal Resin)

The polyvinyl acetal resin is obtained by acetalizing polyvinyl alcohol with an aldehyde. Further, the polyvinyl alcohol can be obtained by saponifying a polyvinyl ester such as polyvinyl acetate, for example. The polyvinyl acetal resin may be used alone or in combination of two or more thereof.

As the polyvinyl alcohol, a polyvinyl alcohol having a saponification degree of 80 to 99.8 mol % is generally used. The average degree of polymerization of the polyvinyl alcohol is preferably 150 or more and 1500 or less in order to adjust the average degree of polymerization of the polyvinyl acetal resin to within a desired range. The average degree of polymerization of the polyvinyl alcohol is determined by a method carried out in accordance with JIS K6726 "Polyvinyl alcohol test method".

The number of carbon atoms of the acetal group included in the polyvinyl acetal resin is not particularly limited, but is preferably 1 to 10, more preferably 2 to 6, and further preferably 4. Specifically, as the acetal group, a butyral group is particularly preferable, and therefore, as the polyvinyl acetal resin, a polyvinyl butyral resin is preferable. The degree of acetalization of the polyvinyl acetal resin is preferably 40 mol % or more, and preferably 85 mol % or less. Further, the degree of acetalization is more preferably 60 mol % or more, and more preferably 75 mol % or less. By setting the degree of acetalization to within these ranges, it is easier to adjust the amount of hydroxyl groups to within a desired range, which is described later. The degree of acetalization means the degree of acetalization when the acetal group of the polyvinyl acetal resin is an acetoacetyl group, and means the degree of butyralization when the acetal group is a butyral group.

The amount of hydroxyl groups in the polyvinyl acetal resin is preferably 15 mol % or more, and preferably 35 mol % or less. By setting the amount of hydroxyl groups to 15 mol % or more, the adhesiveness of the interlayer film to the glass plates is good, and it is easier to improve the adhesive strength. Further, by setting the amount of hydroxyl groups to 35 mol % or less, it is possible to prevent the interlayer film from becoming hard and the average storage modulus (G') from becoming too high.

From these viewpoints, the amount of hydroxyl groups in the polyvinyl acetal resin is more preferably 20 mol % or more, further preferably 25 mol % or more, and is more preferably 33 mol % or less.

The degree of acetylation (acetyl group amount) of the polyvinyl acetal resin is preferably 0.1 mol % or more, and preferably 20 mol % or less. When the degree of acetylation is equal to or more than the above lower limit value, compatibility with other resins such as acrylic resin tends to be good. Further, when the degree of acetylation is equal to or less than the above upper limit value, the moisture resistance of the interlayer film is increased. From these viewpoints, the degree of acetylation is more preferably 0.3 mol % or more, and further preferably 0.5 mol % or more, and more preferably 10 mol % or less, further preferably 5 mol % or less, and still further preferably 3 mol % or less.

The amount of hydroxyl groups, the degree of acetalization (degree of butyralization), and the degree of acetylation can be calculated from results measured by a method carried out in accordance with JIS K6728 "Polyvinyl butyral test method".

The average degree of polymerization of the polyvinyl acetal resin is preferably 100 or more and 1500 or less. By adjusting the average degree of polymerization to be no more than the upper limit value, the average storage modulus (G') can be set to a comparatively low value, and cracking, warpage, delamination, and the like of the glass plate are more easily prevented. Further, by setting the average degree of polymerization to be no less than the lower limit value, the mechanical strength and the like of the interlayer film tends to be improved. From these viewpoints, the average degree of polymerization of the polyvinyl acetal resin is more preferably 150 or more, further preferably 200 or more, and still further preferably 220 or more, and the average degree of polymerization is more preferably 1300 or less, further preferably 1100 or less, and still further preferably 900 or less.

The average degree of polymerization of the polyvinyl acetal resin is the same as the average degree of polymerization of the polyvinyl alcohol used as a raw material, and can be determined based on the average degree of polymerization of the polyvinyl alcohol.

The aldehyde used in producing the polyvinyl acetal resin is not particularly limited, but in general an aldehyde having 1 to 10 carbon atoms is preferably used. The aldehyde having 1 to 10 carbon atoms is not particularly limited, and examples thereof may include formaldehyde, acetaldehyde, propionaldehyde, n-butyraldehyde, isobutylaldehyde, n-valeraldehyde, 2-ethylbutyraldehyde, n-hexylaldehyde, n-octylaldehyde, n-nonylaldehyde, n-decylaldehyde, benzaldehyde, and the like. Of these, an aldehyde having 2 to 6 carbon atoms, such as acetaldehyde, n-butyraldehyde, n-hexylaldehyde, and n-valeraldehyde, is preferable, and n-butyraldehyde is more preferable.

These aldehydes may be used alone or in combination of two or more thereof.

(Polyvinyl Alcohol Resin)

The polyvinyl alcohol resin (PVA) is obtained by polymerizing a vinyl ester, such as vinyl acetate, according to a conventionally known method to obtain a polymer, and then saponifying the polymer, that is, hydrolyzing it. One kind of PVA may be used, or two or more types may be used in combination.

The PVA may be an unmodified PVA or a modified PVA. Examples of the unmodified PVA include those obtained by saponifying polyvinyl ester. Examples of the modified PVA include a saponified polymer of a vinyl ester and another unsaturated monomer.

Examples of the other unsaturated monomer include a monomer other than a vinyl ester and having a carbon-carbon double bond such as a vinyl group. Specific examples may include an olefin, a (meth)acrylic acid and a salt thereof, a (meth)acrylic acid ester, an unsaturated acid other than a (meth)acrylic acid, salts and esters thereof, a (meth)acrylamide, an N-vinylamide, a vinyl ether, a nitrile, a vinyl halide, an allyl compound, a vinylsilyl compound, isopropenyl acetate, a sulfonic acid group-containing compound, an amino group-containing compound, and the like.

Examples of the olefin include ethylene, propylene, 1-butene, isobutene, and the like. Examples of the (meth)acrylic acid ester include methyl (meth)acrylate, ethyl (meth)acrylate, n-propyl (meth)acrylate, i-propyl (meth)acrylate, and n-butyl (meth)acrylate, 2-ethylhexyl (meth)acrylate, and the like.

Examples of the unsaturated acid other than a (meth)acrylic acid, salts and esters thereof include maleic acid and a salt thereof, a maleic acid ester, itaconic acid and a salt thereof, an itaconic acid ester, methylenemalonic acid and a salt thereof, a methylenemalonic acid ester, and the like.

Examples of the (meth)acrylamide include acrylamide, n-methylacrylamide, N-ethylacrylamide, N,N-dimethylacrylamide, and the like. Examples of the N-vinylamide include N-vinylpyrrolidone and the like. Examples of the vinyl ether include methyl vinyl ether, ethyl vinyl ether, n-propyl vinyl ether, i-propyl vinyl ether, n-butyl vinyl ether, and the like.

Examples of the nitrile include (meth)acrylonitrile and the like. Examples of the vinyl halide include vinyl chloride, vinylidene chloride, and the like. Examples of the allyl compound include allyl acetate, allyl chloride, and the like. Examples of the vinylsilyl compound include vinyltrimethoxysilane and the like.

Examples of the sulfonic acid group-containing compound include a (meth)acrylamide alkane sulfonic acid, such as (meth)acrylamide propane sulfonic acid, and a salt thereof, an olefin sulfonic acid such as ethylene sulfonic acid, allyl sulfonic acid, and methallyl sulfonic acid, or a salt thereof, and the like.

Examples of the amino group-containing compound include allylamine, polyoxyethylene allylamine, polyoxypropylene allylamine, polyoxyethylene vinylamine, polyoxypropylene vinylamine, and the like.

Further, as the modified PVA, a modified PVA obtained by adding a carboxyl group, a sulfonic acid group, an amino group, a pyrrolidone group, or the like to the PVA by graft polymerization or the like may be used.

(Polyurethane Resin)

Examples of the polyurethane resin include a polyurethane obtained by reacting an isocyanate compound with a diol compound, a polyurethane obtained by reacting an isocyanate compound with a diol compound and a chain length extender such as a polyamine, and the like. Further, the polyurethane resin may contain a sulfur atom. In that case, some or all of the above diols may be selected from a polythiol and a sulfur-containing polyol. By using a polyurethane resin, the adhesiveness to organic glass tends to be improved.

(Ethylene-Vinyl Acetate Copolymer Resin)

The ethylene-vinyl acetate copolymer resin may be a non-crosslinked ethylene-vinyl acetate copolymer resin or a high-temperature crosslinked ethylene-vinyl acetate copolymer resin. Further, as the ethylene-vinyl acetate copolymer resin, an ethylene-vinyl acetate modified resin such as an ethylene-vinyl acetate copolymer saponified product and an ethylene-vinyl acetate hydrolyzate can also be used.

The ethylene-vinyl acetate copolymer resin preferably has a vinyl acetate content of 10 to 50% by mass, and more preferably 20 to 45% by mass, as measured in accordance with JIS K 6730 "Ethylene-vinyl acetate resin test method". By setting the vinyl acetate content to be no less than these lower limit values, the adhesive strength tends to be increased and the penetration resistance of the laminated glass tends to be improved. Further, by setting the vinyl acetate content to be no more than these upper limit values, the breaking strength of the interlayer film is increased, and the impact resistance of the laminated glass is improved.

(Ionomer Resin)

The ionomer resin is not particularly limited, and various ionomer resins can be used. Specific examples thereof include an ethylene-based ionomer, a styrene-based ionomer, a perfluorocarbon-based ionomer, a telechelic ionomer, a polyurethane ionomer, and the like. Among these, an ethylene-based ionomer is preferable because the laminated glass has good mechanical strength, durability, transparency, and the like, and has excellent adhesiveness to glass.

As the ethylene-based ionomer, an ethylene/unsaturated carboxylic acid copolymer ionomer is preferably used because it has excellent transparency and toughness. The ethylene/unsaturated carboxylic acid copolymer is a copolymer having at least a structural unit derived from ethylene and a structural unit derived from an unsaturated carboxylic acid, and may have a structural unit derived from another monomer.

Examples of the unsaturated carboxylic acid include acrylic acid, methacrylic acid, maleic acid and the like. Acrylic acid and methacrylic acid are preferable, and methacrylic acid is particularly preferable. Further, examples of the other monomer include acrylic acid ester, methacrylic acid ester, 1-butene, and the like.

As the ethylene/unsaturated carboxylic acid copolymer, when all the structural units of the copolymer are taken to be 100 mol %, it is preferable that 75 to 99 mol % of the structural units are derived from ethylene and 1 to 25 mol % of the structural units are derived from an unsaturated carboxylic acid.

The ionomer of the ethylene/unsaturated carboxylic acid copolymer is an ionomer resin obtained by neutralizing or crosslinking at least a part of the carboxyl groups of the ethylene/unsaturated carboxylic acid copolymer with a metal ion. The degree of neutralization of the carboxyl groups is usually 1 to 90%, and preferably 5 to 85%.

Examples of the ion source in the ionomer resin include an alkali metal such as lithium, sodium, potassium, rubidium, and cesium, and a polyvalent metal such as magnesium, calcium and zinc. Sodium or zinc is preferable.

The method for producing the ionomer resin is not particularly limited, and the ionomer resin can be produced by a conventionally known production method. For example, in the case of using an ionomer of an ethylene/unsaturated carboxylic acid copolymer as the ionomer resin, for example, the ethylene/unsaturated carboxylic acid copolymer is produced by subjecting ethylene and the unsaturated carboxylic acid to radical copolymerization at high temperature and high pressure. Then, an ionomer of the ethylene/unsaturated carboxylic acid copolymer can be produced by reacting the ethylene/unsaturated carboxylic acid copolymer with a metal compound including the above-described ion source.

(Plasticizer)

The interlayer film may further contain a plasticizer in addition to the resin. The interlayer film is more flexible when it contains a plasticizer, and can also have higher adhesiveness to glass and the like. However, the interlayer film of the present invention preferably does not contain a plasticizer, or even if it contains a plasticizer, only a small amount. When a plasticizer is not contained or is only contained in a small amount, problems such as the plasticizer migrating from the interlayer film to the organic glass and causing cloudiness in the organic glass can be prevented.

Further, in the present invention, even if the amount of plasticizer is small, as described above, for example, by using an acrylic resin and a resin other than the acrylic resin, such as polyvinyl acetal resin, the interlayer film can have better adhesive strength while also having flexibility.

The content of the plasticizer is, per 100 parts by mass of the resin, for example, 0 parts by mass or more and less than 10 parts by mass, preferably 5 parts by mass or less, more preferably 3 parts by mass or less, further preferably 1 part by mass or less, and most preferably 0 parts by mass. That is, it is most preferable for the interlayer film to not contain a plasticizer.

Examples of the plasticizer include an organic ester plasticizer, a phosphate plasticizer such as an organic phosphate plasticizer and an organic phosphite plasticizer, and the like. The plasticizer may be used alone or in combination of two or more thereof. Among these, an organic ester plasticizer is preferable. Examples of the organic ester plasticizer include a monobasic organic acid ester and a polybasic organic acid ester.

Examples of the monobasic organic acid ester include an ester of a glycol and a monobasic organic acid. Examples of the glycol include a polyalkylene glycol in which each alkylene unit has 2 to 4 carbon atoms, and preferably 2 or 3 carbon atoms, and the number of repetitions of the alkylene unit is 2 to 10, and preferably 2 to 4. Further, the glycol may be a monoalkylene glycol having 2 to 4 carbon atoms, and preferably 2 or 3 carbon atoms (that is, there is one repeating unit).

Specific examples of the glycol include ethylene glycol, diethylene glycol, triethylene glycol, tetraethylene glycol, propylene glycol, dipropylene glycol, tripropylene glycol, tetrapropylene glycol, butylene glycol, and the like.

Examples of the monobasic organic acid include an organic acid having 3 to 10 carbon atoms. Specific examples include butyric acid, isobutyric acid, caproic acid, 2-ethylbutyric acid, heptyl acid, n-octyl acid, 2-ethylhexylic acid, n-nonyl acid, decyl acid, and the like.

Specific examples of the monobasic organic acid include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, triethylene glycol di-n-heptanoate, tetraethylene glycol di-n-heptanoate, triethylene glycol di-2-ethylbutyrate, ethylene glycol di-2-ethylbutyrate, 1,2-propylene glycol di-2-ethylbutyrate, 1,3-propylene glycol di-2-ethylbutyrate, 1,4-butylene glycol di-2-ethylbutyrate, 1,2-butylene glycol di-2-ethylbutyrate, and the like.

Further, examples of the polybasic organic acid ester include an ester compound of a dibasic organic acid having 4 to 12 carbon atoms, such as adipic acid, sebacic acid, and azelaic acid, and an alcohol having 4 to 10 carbon atoms. The alcohol having 4 to 10 carbon atoms may have a linear structure, a branched structure, or a cyclic structure.

Specific examples thereof include dibutyl sebacate, dioctyl azelaate, dihexyl adipate, dioctyl adipate, hexylcyclohexyl adipate, diisononyl adipate, heptylnonyl adipate, dibutylcarbitol adipate, and a mixed adipate ester. Further, an oil-modified sebacic acid alkyd and the like may be used. Examples of the mixed adipate ester include an adipate ester produced two or more alcohols selected from an alkyl alcohol having 4 to 9 carbon atoms and a cyclic alcohol having 4 to 9 carbon atoms.

Examples of the organic phosphate plasticizer include a phosphoric acid ester such as tributoxyethyl phosphate, isodecylphenyl phosphate, and triisopropyl phosphate.

Among the examples mentioned above, triethylene glycol-di-2-ethylhexanoate (3GO) is particularly preferably used as the plasticizer.

(Photopolymerization Initiator)

When the interlayer film of the present invention includes a resin cured by active energy rays (first component), it is preferable to add a photopolymerization initiator. Examples of the photopolymerization initiator include an acetophenone compound such as benzophenone, α-aminoalkylphenone, and α-hydroxyalkylphenone, an acylphosphine oxide compound, a titanosen compounds, an oxime ester compound, a benzoin ether compound, thioxanthone and the like. Of these, an acetophenone compound is preferred.

Among the above-described photopolymerization initiators, examples of commercially available products include IRGACURE 184, IRGACURE 369, IRGACURE 379, IRGACURE 379EG, IRGACURE 651, IRGACURE 784, IRGACURE 819, IRGACURE 907, IRGACURE 2959, IRGACURE OXE 01, and Lucirin TPO (all manufactured by BASF), benzoin methyl ether, benzoin ethyl ether, and benzoin isopropyl ether (all manufactured by Tokyo Chemical Industry Co., Ltd.), and the like.

The photopolymerization initiator may be used alone or in combination of two or more thereof.

The blending amount of the photopolymerization initiator in the interlayer film is per 100 parts by mass of the first component (the resin cured by active energy rays), preferably 0.05 parts by mass or more and 10 parts by mass or less, and more preferably 0.2 parts by mass or more and 5 parts by mass or less. By setting the blending amount of the photopolymerization initiator to be no less than these lower limit values, the photocurability of a first component is good. Further, by setting the blending amount to be no more than these upper limit values, a photocurability corresponding to the blending amount can be exhibited.

(Other Additives)

When the interlayer film includes the first component as a resin, a chain transfer agent may be blended. The chain transfer agent is not particularly limited, and examples thereof may include a mercapto compound such as pentaerythritol tetrakis(3-mercaptobutyrate). When a chain transfer agent is used, it is possible to suppress an increase in the molecular weight of the first component, which allows the average storage modulus (G') to be lowered.

In addition to the chain transfer agent, various other additives may also be added to the interlayer film. Specific examples thereof include an ultraviolet absorber, an infrared absorber, an antioxidant, a light stabilizer, an adhesive strength modifier, a pigment, a dye, a fluorescent whitening agent, a crystal nucleating agent, and the like.

The thickness of the interlayer film is not particularly limited, but is preferably 0.05 mm or more and 3 mm or less. By setting the thickness of the interlayer film to within the above range, the adhesiveness of the interlayer film is improved, and the penetration resistance and the like are also improved. Further, by setting the thickness to be no more than the upper limit value, a deterioration in the transparency of the interlayer film can be prevented. The thickness of the interlayer film is more preferably 0.1 mm or more, further preferably 0.25 mm or more, and still further preferably 2 mm or less.

<Method for Producing Interlayer Film for Laminated Glass>

Next, a method for producing the interlayer film will be described. Hereinafter, an embodiment in which a resin cured by active energy rays (first component) is used as the resin contained in the interlayer film will be described in detail.

In the method for producing an interlayer film according to one embodiment of the present invention, it is advisable to first prepare a curable resin material for forming the interlayer film. In one embodiment of the invention, the curable resin material contains a precursor of the first component. Further, the curable resin material preferably contains a second component in addition to the precursor of the first component. In addition, the curable resin material preferably contains a photopolymerization initiator, and may optionally further contain other additives. The curable resin material is usually a liquid.

Further, in the present invention, as described above, it is preferable that the first component be an acrylic resin. When the first component is an acrylic resin, as the precursor of the first component to be blended in the curable resin material, it is preferable to use a monomer component constituting an acrylic polymer such as an acrylic monomer. When the precursor of the first component is a monomer component, the monomer component is polymerized to become a polymer by irradiating with active energy rays, as described later. In addition, as the second component to be blended in the curable resin material, a resin other than the acrylic resin may be used, but preferably a polyvinyl acetal resin is used. The second component, such as a polyvinyl acetal resin, may be blended in the curable resin material in an already-polymerized form.

In this production method, by mixing the second component with the precursor of the first component, it is easier to form a phase-separated structure such as a sea-island structure in the interlayer film.

The method for preparing the curable resin material is not particularly limited, and may be carried out by mixing in a mixer, in addition to the precursor of the first component, the second component, photopolymerization initiator, plasticizer, and other additives to be optionally blended. Further, a solvent may optionally be added to the curable resin material, and the curable resin material may also be diluted with a solvent. When diluting with a solvent, it is advisable to remove the solvent by drying or the like before, for example, irradiating with active energy rays as described later.

The mixer is not particularly limited, but a known stirrer such as a rotation/revolution mixer or a stirrer equipped with a stirrer blade can be used.

The curable resin material prepared as described above may then be formed into a membrane. The method for forming the curable resin material into a membrane is not particularly limited, but the curable resin material may be coated onto a base material or a release film that has been subjected to a release treatment.

Further, the curable resin material in a membrane may be formed between two substrates by coating or the like a curable resin material on a base material disposed on a substrate or a release film subjected to a release treatment and then placing another substrate on the substrate via a spacer or the like. As a result, a cured product of the curable resin material (that is, the interlayer film) has a thickness corresponding to the height of the spacer. In addition, a base material, a release film that has undergone a release treatment, or the like may be disposed on the surface of another substrate that is in contact with the curable resin material. At least one of the two substrates transmits active energy rays, and a glass plate is usually used.

Next, the curable resin material formed in a membrane is irradiated with active energy rays. The active energy rays are not limited as long as the first component can be cured. Examples thereof include ionizing radiation such as ultraviolet rays, electron beams, α rays, β rays, and γ rays. Among these, ultraviolet rays (UV) are particularly preferable from the viewpoint of curability and convenience. The active energy rays may be irradiated from one side of the curable resin material formed in a membrane (that is, one side of the substrate), or both sides of the curable resin material (that is, both sides of the substrate).

By appropriately adjusting the irradiation amount of the active energy rays, the degree of curing (degree of polymerization) of the first component contained in the curable resin material can be adjusted, which enables the average storage modulus (G') to also be adjusted. Specifically, if the irradiation amount of the active energy rays is increased, the degree of polymerization of the first component is increased and the average storage modulus (G') is increased. Further, if the irradiation amount of the active energy rays is reduced, the degree of polymerization of the first component is lowered, and the average storage modulus (G') is reduced.

The irradiation amount of the active energy rays is not particularly limited, but from the viewpoint of making it easier to adjust the average storage modulus (G') to be within the predetermined range while ensuring the adhesive strength in the requirement (I), is preferably 100 mJ/cm$^2$ or more and 15000 mJ/cm$^2$ or less, and more preferably 500 mJ/cm$^2$ or more and 3000 mJ/cm$^2$ or less.

By irradiating with active energy rays to cure the first component, an interlayer film can be obtained. When a base material or a release film is laminated on the obtained interlayer film, they may be appropriately peeled off from the interlayer film.

The method for producing the interlayer film is not limited to the method described above, and any other method may be used. For example, the resin and the other additives to be optionally blended may be kneaded to obtain a resin composition, and then the obtained resin composition is extruded, press-formed, or the like to obtain the interlayer film. In this case, the resin may be polymerized in advance. Therefore, even when the first component is used as the resin, a precursor of the first component is cured (polymerized) in advance by, for example, irradiating it with active energy rays, and the first component obtained by the curing (polymerization) may be mixed with the other components.

In the above description, an embodiment is described in which the interlayer film has a single-layer structure composed of one resin layer. However, the interlayer film may have a multilayer structure in which a plurality of resin layers are laminated. Even in the case of a multilayer structure, the composition of each resin layer may be appropriately adjusted so that the overall interlayer film has each of the compositions described above. For example, the resin constituting each resin layer may be appropriately selected and used from among the above-described resins.

[Laminated Glass]

The laminated glass of the present invention comprises the above-described interlayer film for laminated glass and the first glass and second glass laminated via the interlayer film. Since the interlayer film used in the laminated glass of the present invention is as described above, a description thereof will be omitted here.

In the laminated glass of the present invention, the first glass is an organic glass and the second glass is any one of an organic glass and an inorganic glass. Organic glass generally has a large linear expansion coefficient, and shrinks by a comparatively large amount due to the cooling after the thermocompression bonding that is described later. Therefore, if at least one of the first glass and the second glass is an organic glass, warpage, cracking, and delamination tend to occur in the laminated glass. However, in the present invention, the interlayer film has the above-described composition, and therefore warpage, cracking, and delamination due to such shrinkage of the organic glass can be suppressed.

In the present invention, it is preferable that the first glass be an organic glass and the second glass be an inorganic glass. As described above, when an organic glass is used for the first glass and an inorganic glass is used for the second glass, although warpage, cracking, and delamination tend to occur due to the difference in these linear expansion coefficients, in the present invention, the interlayer film has the above-described structure, and therefore warpage, cracking, and delamination due to a difference in linear expansion coefficients can be suppressed.

[Inorganic Glass]

The inorganic glass used in the present invention is composed of an inorganic glass plate. Examples of the inorganic glass include, but are not particularly limited to, float plate glass, tempered glass, colored glass, polished plate glass, template glass, meshed plate glass, wire plate glass, UV absorbing plate glass, infrared reflecting plate glass, infrared absorbing plate glass, green glass, and the like. The inorganic glass may be subjected to a surface treatment.

The thickness of the inorganic glass is not particularly limited, but is preferably 0.1 mm or more, and more preferably 1.0 mm or more, and is preferably 5.0 mm or less, and more preferably 3.2 mm or less.

[Organic Glass]

The organic glass used in the present invention is composed of an organic glass plate. Examples of the organic glass include, but are not particularly limited to, a polycarbonate plate, a polymethyl methacrylate plate, an acrylonitrile styrene copolymer plate, an acrylonitrile butadiene styrene copolymer plate, a polyester plate, a fluororesin plate, a polyvinyl chloride plate, a chlorinated polyvinyl chloride plate, a polypropylene plate, a polystyrene plate, a polysulfone plate, an epoxy resin plate, a phenol resin plate, an unsaturated polyester resin plate, a polyimide resin plate, and the like. The organic glass may be subjected to an appropriate surface treatment.

Among the above, a polycarbonate plate is preferable from the viewpoints of excellent transparency, impact resistance, and combustion resistance, and a polymethyl methacrylate plate is preferable from the viewpoints of high transparency, weather resistance, and mechanical strength. Among these, a polycarbonate plate is preferable.

The specific thickness of the organic glass is not particularly limited, but is preferably 0.1 mm or more, and more preferably 0.3 mm or more, and is preferably 5.0 mm or less, and further preferably 3.0 mm or less.

The laminated glass of the present invention can be used in various fields. Specifically, it is used for a window glass of various vehicles such as automobiles, train carriages, ships, and airplanes, and various structures such as buildings, condominiums, detached houses, halls, and gymnasiums.

(Method for Producing Laminated Glass)

The laminated glass of the present invention may be produced by disposing the interlayer film between the inorganic glass and the organic glass, and then thermocompression bonding these. The method for disposing the interlayer film between the inorganic glass and the organic glass is not particularly limited, but, for example, it is preferable to sandwich an interlayer film produced in advance between the inorganic glass and the organic glass. Further, when the interlayer film is composed of a plurality of resin layers, separately provided resin layers may be laminated and disposed so as to be between the inorganic glass and the organic glass, and then subjected to thermocompression bonding.

After the interlayer film or the plurality of resin layers have been disposed between the inorganic glass and the organic glass, but before the thermocompression bonding is performed, air remaining between the inorganic glass and the organic glass may optionally be degassed. The degassing method is not particularly limited, but it is acceptable to pass through a pressing roll or to put in a rubber bag remove the air under reduced pressure.

Further, temporary adhesion may be performed before the thermocompression bonding. The temporary adhesion may be performed, for example, by pressing the inorganic glass and the organic glass between which the interlayer film or plurality of resin layers are disposed at a relatively low pressure, optionally while heating. The temporary adhesion may be performed, for example, with a vacuum laminator. In the case of degassing, the temporary adhesion may be performed after the degassing or together with the degassing.

The thermocompression bonding method is not particularly limited, but it is acceptable to apply pressure while heating in a state in which the interlayer film or plurality of resin layers are disposed between the inorganic glass and the organic glass. The heating temperature is preferably 60° C. or more and 150° C. or less, and more preferably 70° C. or more and 120° C. or less. The pressure is preferably 0.4 MPa or more and 1.5 MPa or less, and more preferably 0.5 MPa or more and 1.3 MPa or less. Further, the thermocompression bonding may employ a method of using an autoclave, a heating press, or the like, but it is preferable to use an autoclave. By performing thermocompression bonding using an autoclave or the like, although warpage, cracking, delamination, and the like tend to occur in the laminated glass during cooling after the thermocompression bonding, in the present invention, such warpage, cracking, delamination, and the like are suppressed by using the above-described interlayer film.

EXAMPLES

The present invention will now be described in more detail by way of examples, but the present invention is not limited to these examples.

The methods for measuring and evaluating the various physical properties in the examples and comparative examples were as follows.

[Cross Peeling Test]

A 25 mm×100 mm glass plate having a thickness of 1.8 mm and a 25 mm×100 mm polycarbonate plate having a thickness of 2 mm were used as adherends. Clear float glass (manufactured by Central Glass Co., Ltd.) was used as the glass plate, and "C1600" (manufactured by C.I Takiron Corporation) was used as the polycarbonate plate glass. Further, the interlayer film obtained in each example and comparative example was cut to a size of 15 mm×15 mm.

The two adherends were laminated in a cross shape via the interlayer film, temporarily fixed with tape, and then using a 0.8 mm spacer having the thickness as the interlayer film so that the thickness of the interlayer film is constant, were temporarily bonded for 3 minutes under conditions of 60° C. and 0.1 MPa in a vacuum laminator. Then, a cross peeling test sample was obtained by performing main pressure-bonding for 1 hour under conditions of 80° C. and 0.5 MPa in an autoclave.

The adhesive strength (N/mm$^2$) was determined by setting an obtained cross peeling test sample 10 in the jig illustrated in FIG. 1, fixing the clear float plate glass using a Tensilon (manufactured by Orientec Co., Ltd., trade name "UTA-500") according to the method described in the specification, and applying a load to the polycarbonate plate glass.

[Average Storage Modulus (G')]

The interlayer film was cut to a length of 10 mm and a width of 5 mm, and the viscoelasticity was measured using a dynamic viscoelasticity measuring device (manufactured by IT Measurement Control Co., Ltd., trade name "DVA-200") to measure the shear storage modulus. The measurement conditions were as follows. The temperature was raised from −50° C. to 200° C., the storage modulus was detected every 1° C. from −50° C., and the arithmetic mean value of the detected storage modulus at 110 to 150° C. was taken as the average storage modulus (G').

(Measurement Conditions)

Deformation mode: shear mode
Measurement temperature: −50° C. to 200° C.
Rate of increase in temperature: 5° C./min
Measurement frequency: 1 Hz
Strain: 1%

[Glass Transition Temperature (Tg1)]

The first glass transition temperature (Tg1) is determined by reading the peak temperature of a loss tangent tan δ obtained from the result of the above-described viscoelasticity measurement, and is the first peak temperature counted from the low temperature side in the temperature range of −50 to 150° C.

The laminated glass samples obtained in each of the examples and comparative examples were evaluated for delamination, cracking, and warpage according to the following evaluation criteria.

(Delamination)

A: No peeling was observed between the layers of the obtained laminated glass sample.
B: Peeling was observed between the layers of the corners of the obtained laminated glass sample, but no peeling was observed in the peripheral sections other than the corners.
C: Peeling was observed in peripheral sections other than the corners of the obtained laminated glass sample.
D: Significant peeling was observed between the layers of the obtained laminated glass sample.

(Cracking)

A: No cracking was observed in the obtained laminated glass sample.
D: Cracking was observed in the obtained laminated glass sample.

(Warp Age)

The laminated glass sample obtained in each example and comparative example was subjected to an autoclave treatment, and then a 25 mm×305 mm, 2 mm-thick SUS plate was immediately placed on the glass surface thereof. The laminated glass sample was fixed by sandwiching it between a clamp 35 mm from the end, and then at a position 270 mm away from the clamp, the gap between the edge of the laminated glass sample and the SUS plate was measured as the warpage. The warpage amount was evaluated according to the following evaluation criteria. It is noted that the warpage amount was evaluated up to the first decimal place as significant figures.

A: 0.9 mm or less
B: 1.0 mm or more and 2.9 mm or less
C: 3.0 mm or more and 4.9 mm or less
D: 5.0 mm or more Examples 1 to 5 and Comparative Examples 1, 2, and 4

(Preparation of Curable Resin Material)

The components shown in Table 1 were blended in a stirring vessel in the predetermined ratios shown in Table 1. The blended product was stirred at 2000 rpm for 9 minutes using a rotation/revolution mixer ("Awatori Rentaro ARE-310", manufactured by Thinky Corporation), and then cells were removed by processing for 3 minutes at 2200 rpm. This operation was repeated until the blended product became uniform to obtain a liquid curable resin material.

(Preparation of Interlayer Film)

A PET release film (trade name "PET50X1-C", manufactured by Nipper) was closely adhered to the upper surface of a coated glass with ethyl acetate so that the release treatment surface was on top. The curable resin material obtained above was coated on the release treatment surface of the PET release film, and then spacers were disposed on the two edges of the PET release film so that the cured product would have a predetermined thickness. A UV transmitting glass having the same size as the coated glass was provided, and a PET release film was also closely adhered on the UV transmitting glass with ethyl acetate so that the release treatment surface was exposed. The curable resin material and the spacers were sandwiched between the coated glass and the UV transmitting glass, and the UV transmitting glass was placed over the curable resin material so that the release treatment surface of the PET release film faced inward. Then, the curable resin material was cured by using a UV irradiator to irradiate ultraviolet rays from above the UV transmitting glass at an illuminance of 3 mW/cm$^2$ so that the irradiation amount was 900 mJ/cm$^2$ to obtain an interlayer film. The thickness of the interlayer film was 0.8 mm.

(Production of Laminated Glass)

A 25 mm×305 mm glass plate having a thickness of 1.8 mm and a 25 mm×305 mm polycarbonate plate having a thickness of 2 mm were laminated via an interlayer film cut to 30 mm×310 mm, temporarily fixed with tape, and then temporarily adhered for 3 minutes at 60° C. and 0.1 MPa in a vacuum laminator (trade name "MVLP 500/600", manufactured by Meiki & Company, Ltd.). Then, main pressure-bonding was performed in an autoclave (trade name "HP-5050MAH-H14", manufactured by Kyoshin Engineering Co., Ltd.) at 80° C. and 0.5 MPa for 1 hour to obtain a laminated glass sample. A float plate glass (manufactured by Central Glass Co., Ltd.) was used as the glass plate, and "C1600" (manufactured by C.I. Takiron Corporation) was used as the polycarbonate plate.

Comparative Example 3

The interlayer film was produced in the same manner as in Example 1, except that the polyurethane resin was formed into a sheet.

TABLE 1

|  |  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|
| Composition (parts by mass) | PVAc | Polyvinyl acetal 1 |  |  | 15 | 15 |  | 100 |  |  |  |
|  |  | Polyvinyl acetal 2 | 30 | 15 |  |  | 15 |  |  |  |  |
|  |  | Polyvinyl acetal 3 |  |  |  |  |  |  | 10 |  |  |
|  | Acrylic monomer | BA | 55 | 34 | 55 | 60 | 55 |  |  |  | 20 |
|  |  | BzA | 25 | 24 | 25 | 20 | 25 |  | 14 |  |  |
|  |  | MEDOL-10 | 20 | 42 |  | 20 | 20 |  | 41 |  |  |
|  |  | M-5300 |  |  | 20 |  |  |  | 45 |  |  |
|  |  | GMA |  |  |  | 10 |  |  |  |  |  |
|  |  | EHA |  |  |  |  |  |  |  |  | 78 |
|  |  | AaC |  |  |  |  |  |  |  |  | 2 |
|  |  | MOI |  |  |  |  |  |  |  |  | 5 |
|  | PU |  |  |  |  |  |  |  |  | 100 |  |
|  | Plasticizer |  |  |  |  |  |  | 20 |  |  |  |
|  | Photopolymerization initiator |  | 2 | 2 | 2 | 2 | 2 |  | 2 |  | 2 |
|  | Chain transfer agent |  |  |  |  |  |  |  | 0.25 |  |  |
| Content in interlayer film (based on total amount of resin, % by mass) | Polyvinyl acetal |  | 23% | 13% | 12% | 13% | 13% | 100% | 9% | — | — |
|  | Acrylic resin |  | 77% | 87% | 88% | 87% | 87% | 0% | 91% | — | 100% |
| Physical property | Tg1 | °C. | −26 | −8 | −19 | −26 | −27 | 22 | −14 | 14 | −28 |
|  | Average storage modulus (G') | 110–150°C.(Pa) | 3088 | 3562 | 12817 | 9000 | 2870 | 99968 | 727 | 48000 | 262250 |
|  | Cross adhesive strength | N/mm² | 0.36 | 0.67 | 1.29 | 0.98 | 0.74 | 0.23 | 0.13 | 1.45 | 0.13 |
| Evaluation | Delamination |  | B | B | A | A | A | C | C | A | D |
|  | Cracking |  | A | A | A | A | A | A | A | D | A (peeling) |
|  | Warpage |  | A | A | B | A | A | D | A | C | A (peeling) |

The polyvinyl acetal resins in Table 1 are as follows. It is noted that polyvinyl acetal 1 and polyvinyl acetal 2 were polyvinyl butyral resins, and polyvinyl acetal 3 was a polyvinyl acetoacetal resin in which the acetal group was an acetoacetal group.

TABLE 2

|  | Polyvinyl acetal 1 | Polyvinyl acetal 2 | Polyvinyl acetal 3 |
|---|---|---|---|
| Degree of butyralization (mol %) | 68 | 71 |  |
| Degree of acetoacetalization (mol %) |  |  | 74 |
| Degree of acetylation (mol %) | 1 | 1 | 1 |
| Hydroxy groups (mol %) | 31 | 28 | 25 |
| Degree of polymerization | 830 | 240 | 560 |

The acrylic monomers in Table 1 are as follows.

(Acrylic Monomers)

BA: n-butyl acrylate
BzA: benzyl acrylate
MEDOL-10: (2-methyl-2-ethyl-1,3-dioxolane-4-yl) methyl acrylate, trade name "MEDOL-10", Osaka Organic Chemical Industry Ltd.
M-5300: ω-carboxy-polycaprolactone monoacrylate, trade name "Aronix M-5300", manufactured by Toagosei Co., Ltd.
GMA: glycidyl methacrylate
EHA: 2-ethylhexyl acrylate
Aac: acrylic acid
MOI: 2-methacryloyloxyethyl isocyanate The components in Table 1 other than the polyvinyl acetal resin and acrylic monomer are as follows.

PU: polyurethane resin, trade name "AG8451", manufactured by Nippon Lubrizol Co., Ltd.
Plasticizer: triethylene glycol di-2-ethylhexanoate (3GO)
Photopolymerization initiator: trade name "Irgacure184", manufactured by Ciba Specialty Chemicals
Chain transfer agent: pentaerythritol tetrakis(3-mercaptobutyrate), trade name "Karenz-MTPE1" manufactured by Showa Denko KK In each of the above examples, since the average storage modulus (G') was 15000 Pa or less and the adhesive strength in the cross peeling test was 0.3 N/m² or more, all of delamination, cracking, and warpage could be suppressed. On the other hand, in the comparative examples, since the average storage modulus (G') was larger than 15000 Pa and the adhesive strength in the cross peeling test was less than 0.3 N/m², all of delamination, cracking, and warpage could not be suppressed.

The invention claimed is:

1. An interlayer film for laminated glass having an average storage modulus (G') at 110 to 150° C. measured at a frequency of 1 Hz in a shear mode of 15000 Pa or less, having a first glass transition temperature (Tg1) counted from the low temperature side in a temperature range of −50 to 150° C. of −50 to −19° C. and having an adhesive strength of 0.3 N/mm² or more as measured in a cross peeling test performed under the following conditions on a cross peeling test sample obtained by carrying out, in order, a first process, a second process, and a third process, wherein, in the first process, an interlayer film for laminated glass having a length of 15 mm and a width of 15 mm, a clear float plate glass having a thickness of 1.8 mm, a length of 25 mm, and a width of 100 mm in accordance with JIS 3202, and a polycarbonate plate glass having a thickness of 2 mm, a length of 25 mm and a width of 100 mm in accordance with JIS K6735 are provided, and the clear float plate glass and the polycarbonate plate glass are laminated in a cross shape via the interlayer film for laminated glass, wherein, in the second process, using a spacer having the same thickness as the interlayer film for laminated glass so that the thickness of the interlayer film for laminated glass is constant, the clear float plate glass and the polycarbonate plate glass laminated via the interlayer film for laminated glass are temporarily bonded for 3 minutes under conditions of 60° C. and 0.1 MPa in a vacuum laminator, wherein, in the third process, the temporarily bonded clear float plate glass and polycarbonate plate glass are then subjected to main pressure-bonding for 1 hour under conditions of 80° C. and 0.5 MPa; and wherein, in the cross peeling test, a maximum load (N) when the polycarbonate plate glass is peeled from the clear float plate glass in a direction perpendicular to an adhesive surface at a rate of 10 mm/min at 23° C. is measured, and that measured maximum load (N) is taken as the adhesive strength.

2. The interlayer film for laminated glass according to claim 1, which comprises an acrylic resin.

3. The interlayer film for laminated glass according to claim 2, further comprising a polyvinyl acetal resin.

4. The interlayer film for laminated glass according to claim 1, which comprises a resin cured by active energy rays.

5. The interlayer film for laminated glass according to claim 1, wherein a content of a plasticizer is 0 parts by mass or more and less than 10 parts by mass per 100 parts by mass of the resin included in the interlayer film for laminated glass.

6. A laminated glass comprising:
   the interlayer film for laminated glass according to claim 1; and
   a first glass and a second glass that are laminated via the interlayer film for laminated glass,
   wherein the first glass is an organic glass and the second glass is any one of an organic glass and an inorganic glass.

7. The laminated glass according to claim 6, wherein the second glass is an inorganic glass.

\* \* \* \* \*